United States Patent [19]
Lupien et al.

[11] Patent Number: 5,689,652
[45] Date of Patent: Nov. 18, 1997

[54] CROSSING NETWORK UTILIZING OPTIMAL MUTUAL SATISFACTION DENSITY PROFILE

[75] Inventors: William A. Lupien, Hesperus; John Terrell Rickard, Durango, both of Colo.

[73] Assignee: Optimark Technologies, Inc., Durango, Colo.

[21] Appl. No.: 430,212

[22] Filed: Apr. 27, 1995

[51] Int. Cl.$^6$ .................................................. G06F 15/00
[52] U.S. Cl. .................................................. 395/237
[58] Field of Search ................................ 395/237, 235, 395/236

[56] References Cited

U.S. PATENT DOCUMENTS

| | | | |
|---|---|---|---|
| 3,573,747 | 4/1971 | Adams et al. | 395/237 |
| 3,581,072 | 5/1971 | Nymeyer | 395/237 |

(List continued on next page.)

FOREIGN PATENT DOCUMENTS

| | | | |
|---|---|---|---|
| 0411748 | 6/1991 | European Pat. Off. | G06F 15/24 |
| 0434224 | 6/1991 | European Pat. Off. | G06F 15/21 |
| 0 512 702 A2 | 11/1992 | European Pat. Off. | |
| 2 275 796 | 9/1994 | United Kingdom . | |
| WO 9605563A1 | 2/1996 | WIPO . | |

OTHER PUBLICATIONS

McFarland, Margaret, Deputy Secretary, Division of Market Regulation, SEC Release No. 34–34469; File No. SR–CHX–93–19, "Self Regulatory Organizations, Notice of Amendment Nos. 1, 2, 3 and 4 to Proposed Rule Change by Chicago Stock Exchange, Inc. Relating to the Creation of the Chicago Match System" Federal Register vol. 59, No. 150, Aug. 1994.

Katz, Jonathan G., Secretary, Division of Market Regulation, SEC Release No. 34–33542; File No. SR–CHX–93–19, "Self–Regulatory Organizations; Proposed Rule Change by Chicago Stock Exchange, Incorporated Proposing to Establish Rules for an Institutional Trading System, Called the Match Market Exchange Facility" Federal Register vol. 59, No. 24, Jan. 1994.

Colby, Robert L.D., Deputy Director, Division of Market Regulation, Letter from Deputy Director to the Chicago Stock Exchange regarding trading of a new basket product "the Chicago Basket"(CMX Basket) dated Oct. 1993 and Simon, George T., Letter on behalf of the Chicago Stock Exchange requesting interpretation of and exemptive relief from various provisions of the Securities Exchange Act of 1934 and certain rules promulgated thereunder in connection with the trading on the Exchange of groups of equity securities (Basket) dated Sep. 1993.

Primary Examiner—Tommy P. Chin
Assistant Examiner—Bryan S. Tung
Attorney, Agent, or Firm—Kenyon & Kenyon

[57] ABSTRACT

A crossing network that matches buy and sell orders based upon a satisfaction and quantity profile is disclosed. The crossing network includes a number of trader terminals that can be used for entering orders. The orders are entered in the form of a satisfaction density profile that represents a degree of satisfaction to trade a particular instrument at various (price, quantity) combinations. Typically, each order is either a buy order or a sell order. The trader terminals are coupled to a matching controller computer. The matching controller computer can receive as input the satisfaction density profiles entered at each one of the trading terminals. The matching controller computer matches orders (as represented by each trader's satisfaction density profile) so that each trader is assured that the overall outcome of the process (in terms of average price and size of fill) has maximized the mutual satisfaction of all traders. Typically, the matching process is anonymous. The matching process can be continuous or performed on a batch basis.

19 Claims, 16 Drawing Sheets

U.S. PATENT DOCUMENTS

| | | | |
|---|---|---|---|
| 4,334,270 | 6/1982 | Towers | 395/236 |
| 4,412,287 | 10/1983 | Braddock, III | 395/237 |
| 4,674,044 | 6/1987 | Kalmus et al. | 395/237 |
| 4,677,552 | 6/1987 | Sibley, Jr. | 395/237 |
| 4,694,397 | 9/1987 | Grant et al. | 395/242 |
| 4,751,640 | 6/1988 | Lucas et al. | 395/236 |
| 4,903,201 | 2/1990 | Wagner | 395/237 |
| 5,077,665 | 12/1991 | Silverman et al. | 395/237 |
| 5,101,353 | 3/1992 | Lupien et al. | 395/237 |
| 5,136,501 | 8/1992 | Silverman et al. | 395/237 |
| 5,283,731 | 2/1994 | Lalonde et al. | 364/401 |
| 5,375,055 | 12/1994 | Togher et al. | 395/237 |

Surface Order Matching

Quit | Clear | Reset | Apply | Patterns | Remove Boundary

— Order Description —

Side: Buy   Symbol: ibm   Max Quantity: 200000

Time in Force: Until Cancelled | End of Day | Minutes => 20

— Cursor Type —                              — Cursor Position —

Set | More | Less | Boundary | Edit   Price: 75.50   Size: 5250

|      | 70.00 | 70.75 | 71.50 | 72.25 | | | | 73.00 | | | 73.75 | | | 74.50 | |
|------|---|---|---|---|---|---|---|---|---|---|---|---|---|---|---|
| 9750 |   |   | B.1 |   |   |   |   |   |   |   |   |   |   |   |   |
| 9000 |   |   |     | 0.2 | 0.4 | 0.3 | 0.6 | 1.0 | 1.0 | 1.0 | 0.9 | 0.9 | 0.9 | 0.8 | 0.8 | 0.7 |
| 8250 |   |   |     | 0.2 | 0.5 | 0.7 | 0.4 | 0.6 | 1.0 | 1.0 | 1.0 | 0.9 | 0.9 | 0.9 | 0.8 | 0.8 | 0.7 |
| 7500 |   |   | 0.1 | 0.3 | 0.1 | 0.6 | 0.7 | 0.4 | 0.4 | 0.8 | 1.0 | 1.0 | 0.9 | 0.9 | 0.9 | 0.8 | 0.8 | 0.7 |
| 6750 |   |   |     | 0.2 | 0.3 | 0.3 | 0.5 | 0.6 | 0.7 | 0.4 | 0.4 | 0.7 | 1.0 | 0.9 | 0.7 | 0.9 | 0.6 | 0.8 | 0.7 |
| 6000 |   | B.2 | 0.2 | 0.3 | 0.3 | 0.4 | 0.6 | 0.6 | 0.7 | 0.5 | 0.4 | 1.0 | 1.0 | 0.5 | 0.8 | 0.9 | 0.9 | 0.8 |
| 5250 |   |   | 0.1 | 0.2 | 0.1 | 0.4 | 0.4 | 0.6 | 0.6 | 0.7 | 0.4 | 0.7 | 1.0 | 1.0 | 0.8 | 0.9 | 0.9 | 0.8 |
| 4500 |   |   | 0.1 | 0.2 | 0.1 | 0.3 | 0.4 | 0.6 | 0.3 | 0.8 | 0.7 | 1.0 | 1.0 | 1.0 | 1.0 | 0.9 | 0.8 |
| 3750 |   |   |     | 0.1 | 0.1 | 0.2 | 0.2 | 0.5 | 0.6 | 0.4 | 0.4 | 0.4 | 0.7 | 1.0 | 1.0 | 0.9 | 0.9 |
| 3000 |   |   |     |     | B3 | 0.2 | 0.3 | 0.4 | 0.5 | 0.6 | 0.6 | 0.8 | 0.9 | 1.0 | 1.0 | 1.0 | 0.9 |
| 2250 |   |   |     |     | 0.1 | 0.2 | 0.3 | 0.4 | 0.3 | 0.6 | 0.5 | 0.9 | 1.0 | 1.0 | 1.0 | 0.9 |
| 1500 |   |   |     |     |     | 0.2 | 0.2 | 0.3 | 0.4 | 0.6 | 0.7 | 0.7 | 0.9 | 1.0 | 1.0 | 1.0 |
| 750  |   |   |     |     | B4 | 0.2 | 0.3 | 0.4 | 0.6 | 0.7 | 0.8 | 0.9 | 1.0 | 1.0 | 1.0 |
| 0    |   |   |     |     |   |   |   |   |   |   |   |   |   |   |   |

Surface Order Matching (Quit) (Clear) (Reset) (Apply) (Patterns∨) (Remove Boundary)
—— Order Description ——  —— Surface Description ——
Side ☑ Buy  Symbol MOT   Max Quantity 50000    Center Price 48.00   Min Size 500
                                                Price Range 6.00    Max Size 5000
Time in Force: |Until Cancelled|End of Day|Minutes| => 20    Price |Absolute|Relative|

—— Cursor Type ——                —— Cursor Position ——          —— Display ——   Price Interval
(Set∨) (More) (Less) (Boundary) (Edit)  Price: 50.25  Size: 2000   (Update Grid) (Display Surface)  |1/8|1/2|
                                                                                                    |1/4| 1 |

CROSSING NETWORK UTILIZING OPTIMAL MUTUAL SATISFACTION DENSITY PROFILE

FIELD OF INVENTION

The present invention is directed to an automated crossing network (also known as a matching system) for trading instruments, and in particular, a continuous crossing network that matches buy and sell orders based upon a satisfaction and size profile.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND OF THE INVENTION

Traditionally, traders and investors who desired to buy or sell securities placed orders with brokers who traded on the floor of organized stock exchanges, such as the New York Stock Exchange or the NASDAQ market. Traders and investors, particularly institutional investors, are increasingly balking at the high cost of trading on organized exchanges and in the OTC (Over-The-Counter) market. Discontent with the expense of using intermediaries and the cost of market impact has contributed to the development of the electronic fourth market for crossing trades. See "Reshaping the Equity Markets, A Guide for the 1990s" by Robert A. Schwartz, Harper Business, 1991, especially at pp. 93–95.

Various companies and exchanges operate computerized crossing networks, also called anonymous matching systems. By way of example, crossing networks used in connection with the trading of trading instruments are disclosed in U.S. Pat. No. 4,412,287, which discloses an automated stock exchange in which a computer matches buy and sell orders for a variety of stocks; U.S. Pat. No. 3,573,747, which discloses an anonymous trading system for selling fungible properties between subscribers to the system; U.S. Pat. No. 3,581,072, which discloses the use of a special purpose digital computer for matching orders and establishing market prices in an auction market for fungible goods; U.S. Pat. No. 4,674,044, which discloses an automated securities trading system; U.S. Pat. No. 5,136,501, which discloses an anonymous matching system for effectuating trades through automatic matching in which buyers and sellers who are willing to trade with one another based on specified criteria, such as price, quantity and credit, may automatically trade when matching events occur satisfying these criteria; and U.S. Pat. No. 5,101,353, which discloses an automated system for providing liquidity to securities markets in which orders are entered by the system and executed in real time either internally between system users or externally with stock exchanges and markets.

Crossing networks have a number of advantages, including: (a) traders need not search for a contraparty; and (b) anonymity is preserved.

Existing facilities for crossing trades include Instinet's Crossing Network and POSIT (Portfolio System for Institutional Trading) which is jointly owned by Jefferies and BARRA. The Instinet Crossing Network has an equities trading service to match buyers and sellers anonymously at set times. Computers pair buyers with sellers on a time priority basis. Trades are executed at the closing price for exchange-listed issues, and at the midpoint of the inside market (best bid and ask) for OTC issues.

POSIT, for example, enables large investors to trade baskets of stocks among themselves. The orders are sent to a central computer where they are electronically matched with other orders. Unlike Instinet's Crossing Network, POSIT crosses are done during the trading day. The prices are obtained from those quoted on the exchanges, a practice known as "parasitic pricing." See "Reshaping the Equity Markets, A Guide for the 1990s" cited above.

Instinet, owned by Reuters, also operates an electronic block-trading system that facilitates the negotiation of block trades between institutional investors and brokers. Instinet allows parties to trade anonymously, entering bids electronically. Instinet subscribers can respond to an "order" entered into the system either by matching a displayed price or by making a counter bid or offer that is transmitted instantaneously to the contraparty's terminal. The trades that result from these negotiations become public information only when they are executed. This procedure provides an alternative to the direct human-to-human negotiation of orders in the upstairs market or on the trading floors. Instinet provides a limit order book for over-the-counter (OTC) securities and listed securities and also provides inside quotes for exchange listed securities for the seven U.S. exchanges on which stocks can be traded and for NASDAQ listed securities.

Many crossing networks function independently of existing stock exchanges. However, some crossing networks are operated by stock exchanges.

For example, the Match Market Exchange ("MMX") is operated by the Chicago Stock Exchange. All matched orders are executed at a random time within a predetermined ten minute window at the market price at such time. The market price is calculated based upon the spread of a particular issue. Rather than matching orders on the basis of time priority, thee system uses liquidity fees and liquidity credits to determine the level of priority for order matching. Those users willing to pay the highest liquidity fee have the highest execution priority. See 59 F.R. 5451 (Feb. 4, 1994).

Crossing networks that automatically match buy and sell orders often concentrate trading at a single point of time, and can be called a batch process matching system. There is a need, however, for an anonymous crossing network that continuously, and in real-time, satisfies the buying and selling desires of an arbitrary number of market participants.

A major problem encountered in the design of crossing networks is that of determining how to match buyers and sellers. Existing approaches to this problem include:

Take-out strategies, where overlapping bids and offers are matched at the midpoint of the overlapped bid and ask prices, with priority given to buyers and sellers in order of price. This assumes a significant quantity of non-disclosed orders in the system; otherwise, there would be no incentive for overlap, and take-out would start at the disclosed best bid/offer prices, just like the Instinet book.

Single price auction strategies, where a single, size-weighted average price is computed from overlapping bid and offer prices, and everyone is filled at that price. Again, traders would have to be confident of a significant number of non-disclosed orders in the system to have the incentive to enter orders at a better price than the best disclosed price.

Premium strategies (as in the Chicago MMX system), where bids and offers have an associated positive or negative premium, and crossing takes place at the midpoint of market spread or at the minimum necessary premium differential from the midpoint, with priority given in order of premium. Here, the premium-based priority in matching provides the incentive for offering higher premiums.

Each of the above approaches is a batch process that relies upon ad hoc rules of competition among a relatively small set of discrete orders as being the means of arbitrating the crossing network participants' buy/sell entries. In the real world of trading, orders to buy or sell can enter the market at any time, and discrete orders in a crossing network often represent only an approximate and partial expression of the order fill that would satisfy the trader. For institutional traders in particular, an individual order seldom represents the full desired fill size, and the trader must then employ multiple orders at different prices (and generally in different markets) to achieve his ultimate fill.

Typically, existing crossing networks allow discrete buy or sell orders to be entered, e.g., "sell 10,000 IBM at 64." However, as stated above many traders, particularly institutional traders, wish to deal in baskets of securities, so that, for example, a portfolio is as far as possible, "balanced." Existing crossing networks do not easily allow traders to enter combinations of orders, such as "sell 10,000 IBM at 64 only if I can buy 20,000 DEC at 32". Furthermore, existing crossing networks do not allow traders to enter combinations of orders, such as "sell 10,000 IBM at 64 or sell 100,000 IBM at 63." Traders often have trading strategies such as, for example, "buy 3,000 IBM at 33, but if I can buy 5,000, I would be prepared to pay 33 and ½", that cannot be handled by existing crossing networks.

Given the above limitations of conventional crossing networks, a more satisfactory approach to the overall problem of continuously satisfying the buying and selling desires of an arbitrary number of market participants is needed. Furthermore, a crossing network is needed that will guarantee mathematical optimality of the matching process, so that each participant is assured that the overall outcome of the process (in terms of the price and size of all fills) has maximized the joint satisfaction of all participants.

SUMMARY OF THE INVENTION

The present invention is directed to a computerized crossing network that allows traders to input as orders a satisfaction density profile and maximum size limit which at once characterizes the trader's degree of satisfaction to trade at any and all prices and sizes, up to the aggregate (or size) limit, and that matches orders (as represented by each trader's satisfaction density profile) so that each trader is assured that the overall outcome of the process (in terms of average price and size of fill) has maximized the mutual satisfaction of all traders.

The satisfaction density profile is a two-dimensional grid or matrix (which could also be represented as a two-dimensional graph or in another two-dimensional format), one dimension being price and the second dimension being size of transaction, that as a whole characterizes the trader's degree of satisfaction for a transaction at each (price, size) coordinate. Each element of the satisfaction density profile, called a satisfaction density value, indicates the trader's degree of satisfaction to trade that size order at that price. In the representative embodiment, each satisfaction density value is a number between zero and one, with zero representing no satisfaction (i.e., will under no circumstances trade that quantity at that price) and one representing total satisfaction.

Each trader can input one or more satisfaction density profiles. In the representative embodiment, each satisfaction density profile can be represented and input as a graph of at least two dimensions, such as, for example, as a temperature grid or two dimensional matrix.

Once the satisfaction density profile is complete, the trader causes the satisfaction density profile to be transmitted to a central matching controller ("CMC"), which anonymously matches buy and sell orders as discussed below.

For the purpose of explanation, assume a batch process in which multiple traders enter satisfaction density profiles that represent either buy or sell orders for a particular stock. Upon transmission of the satisfaction density profiles to the CMC, the CMC will cause buy profiles to be stored in a buy profile database and sell profiles to be stored in a sell profile database. The CMC will then calculate, for every buy/sell profile pair, a mutual satisfaction cross product. The mutual satisfaction cross product represents the degree to which that buy/sell pair can satisfy each other. Next, the individual grid values of the mutual satisfaction cross products for all buy/sell combinations are ranked in order, starting with the highest value of mutual satisfaction. The buy/sell orders represented by the ranked grid values of the mutual satisfaction cross products are then matched in order, and matching trades are aggregated by the CMC system. The matching process then continues down the ranked list.

The present invention can easily handle trades of baskets of securities. For example, in the representative embodiment, if a trader wishes to simultaneously both sell IBM and buy DEC, the trader would create a sell satisfaction density profile representing the IBM part of the transaction and a buy satisfaction density profile representing the DEC part of the transaction, and indicate that these profiles are to be linked together. The CMC will then combine these two satisfaction density profiles into one. This combining process can be accomplished, for example, by utilizing a connection matrix and performing matrix manipulation on the two profiles. It will be apparent that other, more complex, combined trades can be accomplished in the same manner.

The present invention can be operated as a batch crossing network, where orders are matched at set times. Alternatively, the present invention can be operated as a continuous crossing network by treating each new satisfaction density profile that is entered as a triggering event that causes a new round of computation as described above.

BRIEF DESCRIPTION OF THE DRAWINGS

FIGS. 6A and 6B show an example screen display showing an interface window, a load pattern interface window and a satisfaction density profile.

FIGS. 7A and 7B show an example buy satisfaction density profile displayed as a temperature graph.

DETAILED DESCRIPTION

The present invention is described below in the context of trading equity securities. However, the invention is not so limited and can be easily adapted to allow the trading of other liquid assets such as futures, derivatives, options, bonds, currencies and the like. Accordingly, where the context permits, the terms "securities", "stock", and "shares" when used herein includes other instruments that can be traded, such as, for example, futures, derivatives, options, bonds and currencies. The terms "buy" and "sell" include, where appropriate, put and call, bid and offer, etc.

Intended users of the representative embodiment system of this invention are typically investors, such as institutional investors (e.g., a pension fund) but may also be individual investors, brokers or others who deal in or trade securities. As used herein, the term "user", "trader" or "investor" means that person or entity who wishes to make a trade.

Figure 1:
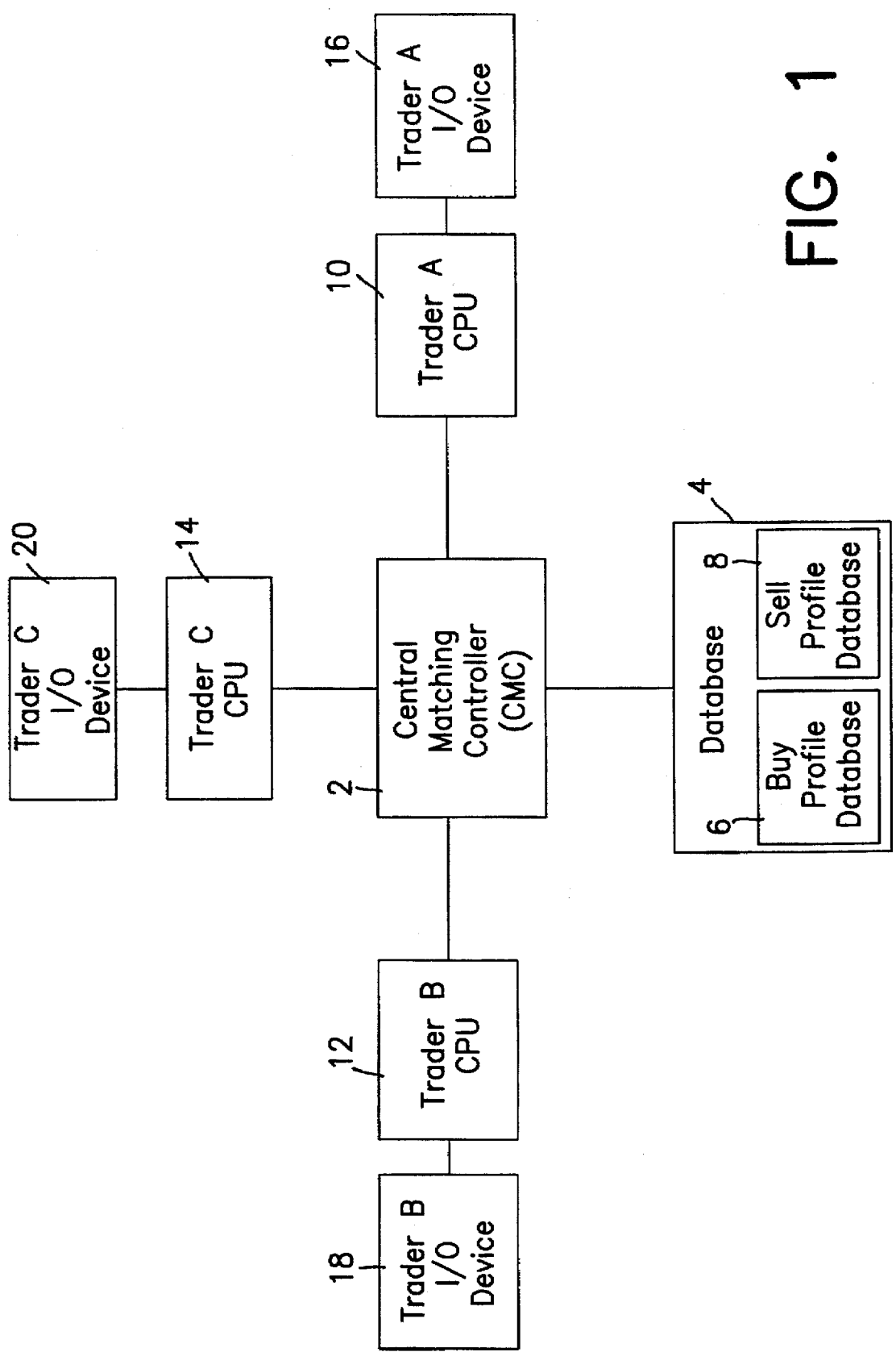
FIG. 1 is a block diagram of a representative system operating according to the present invention.

Referring now to the drawings, and initially FIG. 1, there is illustrated a block diagram of the overall architecture of the crossing network according to the present invention. A central matching controller ("CMC") 2 matches buy and sell orders transmitted to the CMC from various trader terminals, e.g., 10, 12, 14. The CMC 2 is preferably a supercomputer that can perform matrix calculations at rates of multiple gigaflops, such as, for example with present technology, an IBM SP2 or an Intel PARAGON supercomputer. A storage device 4 is coupled to the CMC 2. The storage device 4 comprises a database for storing buy and sell satisfaction density profiles. In the representative embodiment, buy satisfaction density profiles can be stored in a buy profile database 6 and sell satisfaction density profiles can be stored in a sell profile database 8.

Each trader who wished to trade will have access to a trader terminal, such as trader CPU 10, 12, 14. Ideally, the trader terminals 10, 12, 14 are high powered personal computers or workstations. The trader terminals 10, 12, 14 are coupled to the CMC 2. Trader terminals may be coupled to the CMC 2 over a wide area network (WAN) and/or over the Internet. Each trader terminal includes one or more input/output devices 16, 18, 20 that allow for the entry of satisfaction density profiles and the display of output, such as matching trades.

Figure 2:
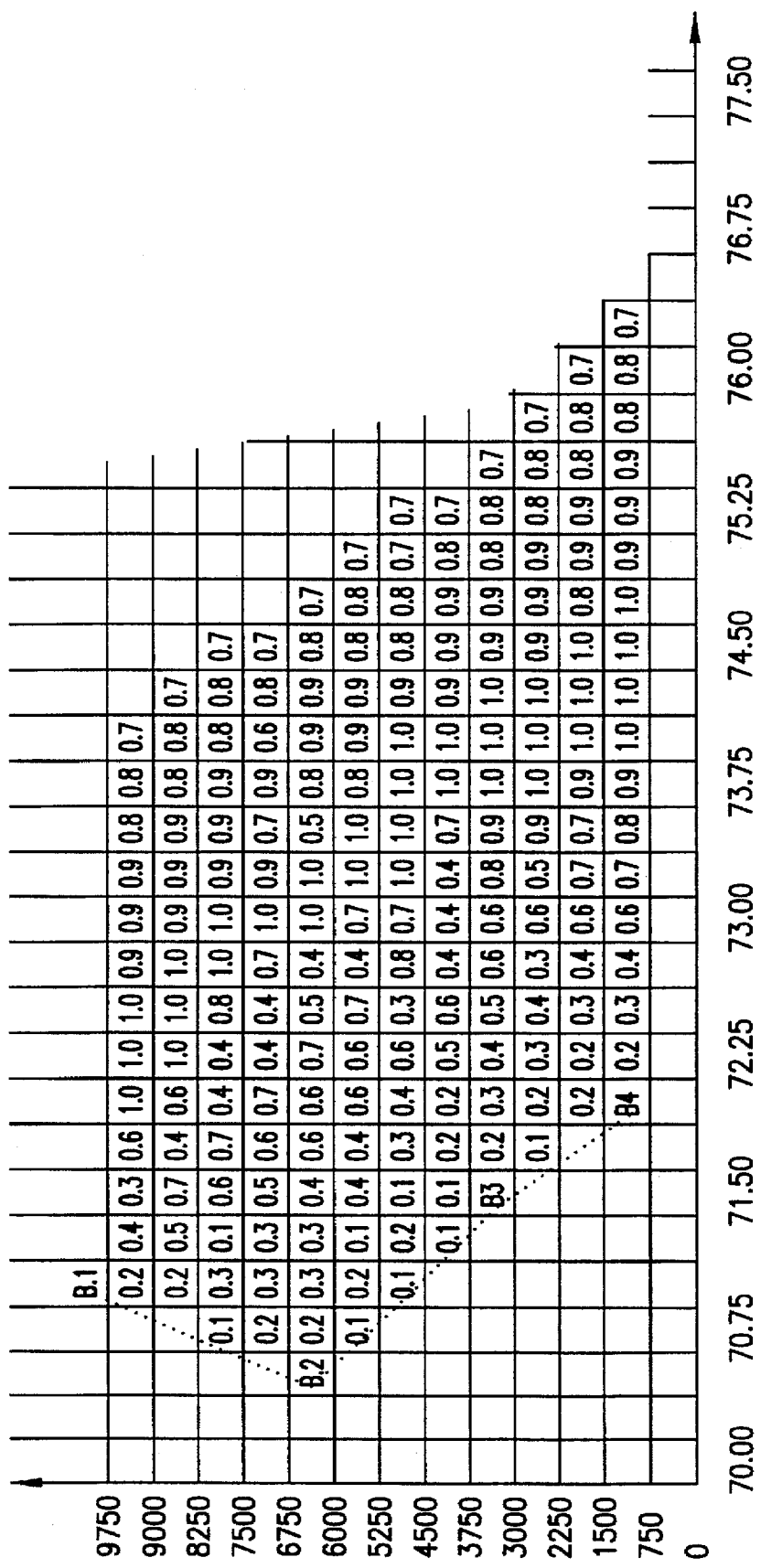
FIG. 2 is an example satisfaction density profile for a sell order.

Turning now to FIG. 2, there is illustrated an example satisfaction density profile for a sell order. In the representative embodiment, each security that a trader wishes to trade requires the creation of a satisfaction density profile. The satisfaction density profile as shown in FIG. 2 is a two-dimensional grid. Quantity is represented on the vertical axis and price is represented on the horizontal axis. (The ranges and scale of each axis can be set by the trader or automatically set by the present invention.) The satisfaction density levels are described by the numbers shown.

The satisfaction density profile characterizes the trader's range of interest in the transaction at each (price, size) combination. The trader is required to enter in one or more places on the satisfaction density profile a satisfaction density value, indicating the trader's willingness to trade that size order at that price. In the representative embodiment shown in FIG. 2, each satisfaction density value is a number between and including zero and one, with zero representing no satisfaction (i.e., will under no circumstances trade that quantity at that price) and one representing total satisfaction.

Thus, for example, FIG. 2 shows that the trader is fully willing to sell 7,500 at $73, but under no circumstances is willing to sell any quantity at $70.25. The satisfaction density value to sell 2,250 at $72.25 is 0.3, indicating a limited degree of satisfaction. FIG. 2 shows that the trader is more willing to sell 8,250 at $72.75 then 1,500 at $73.25.

In FIG. 2, a boundary is shown, marked B1–B2–B3–B4. Using known drawing program techniques, the user is able to draw a boundary on the satisfaction density profile. On one side of the boundary, the user can enter satisfaction density values, On the other side of the boundary, the satisfaction density values are automatically set to zero.

Figure 3A:
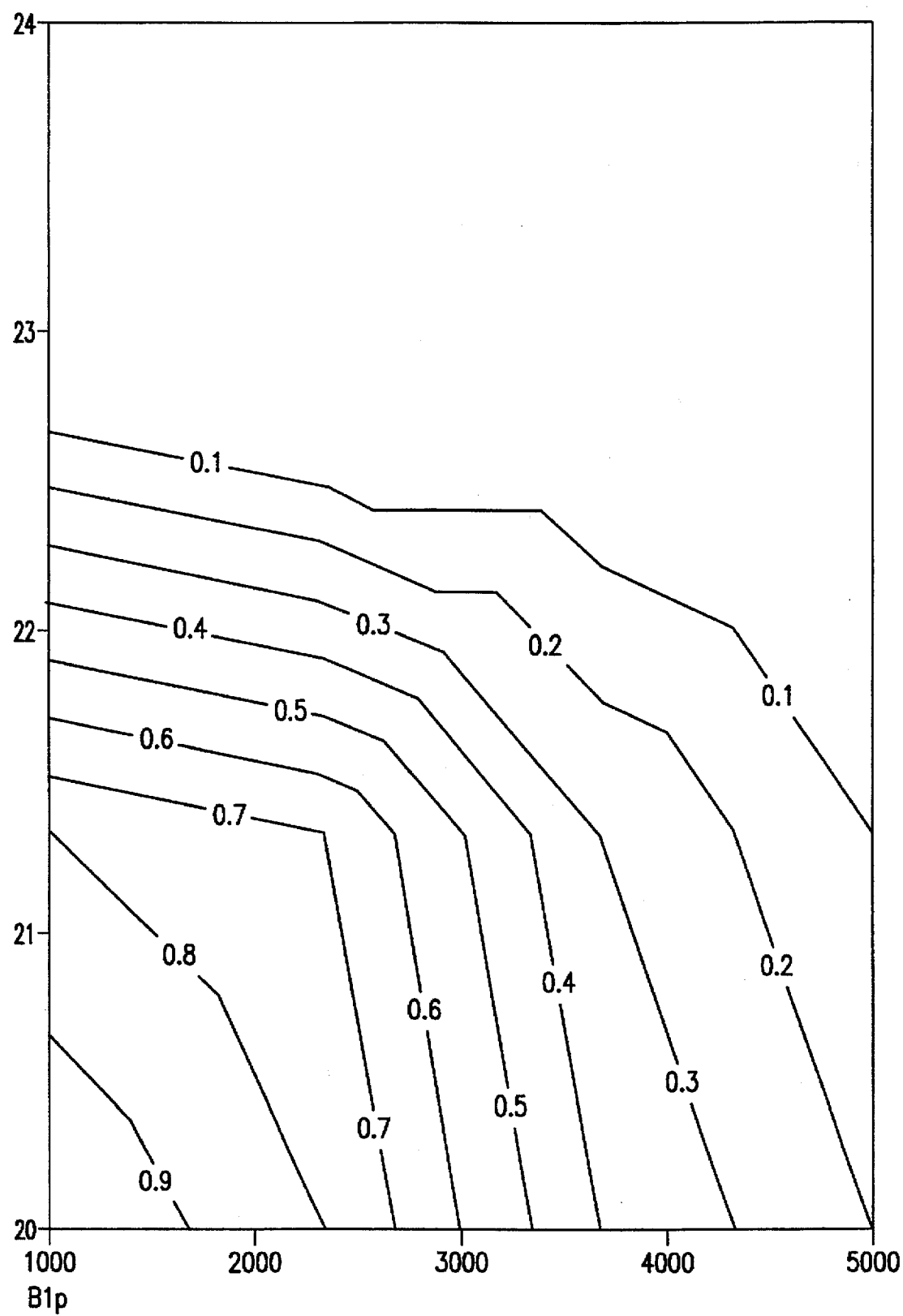
FIGS. 3A to 3D are example satisfaction density profiles in contour plot format.

In FIG. 3A, there is illustrated an example satisfaction density profile for a buy order. The satisfaction density profile as shown in FIG. 3A is a contour plot on a two-dimensional grid. Price is represented on the vertical axis and quantity is represented on the horizontal axis. The satisfaction density levels are described by the contours shown. In the representative embodiment of FIG. 3A, each satisfaction density value is a number between and including zero and one, with zero representing no satisfaction (i.e., will under no circumstances trade that quantity at that price) and one representing total satisfaction.

Thus, for example, FIG. 3A shows that the trader would be highly satisfied to buy 1,500 at $20.50, but under no circumstances is willing to buy any quantity at $24. The satisfaction density value for a buy of 3,000 at $20 is 0.6, indicating a more limited degree of satisfaction. FIG. 3A shows that the trader is more willing to buy 2,000 at $21 then 4,000 at $21.

Figure 3B:
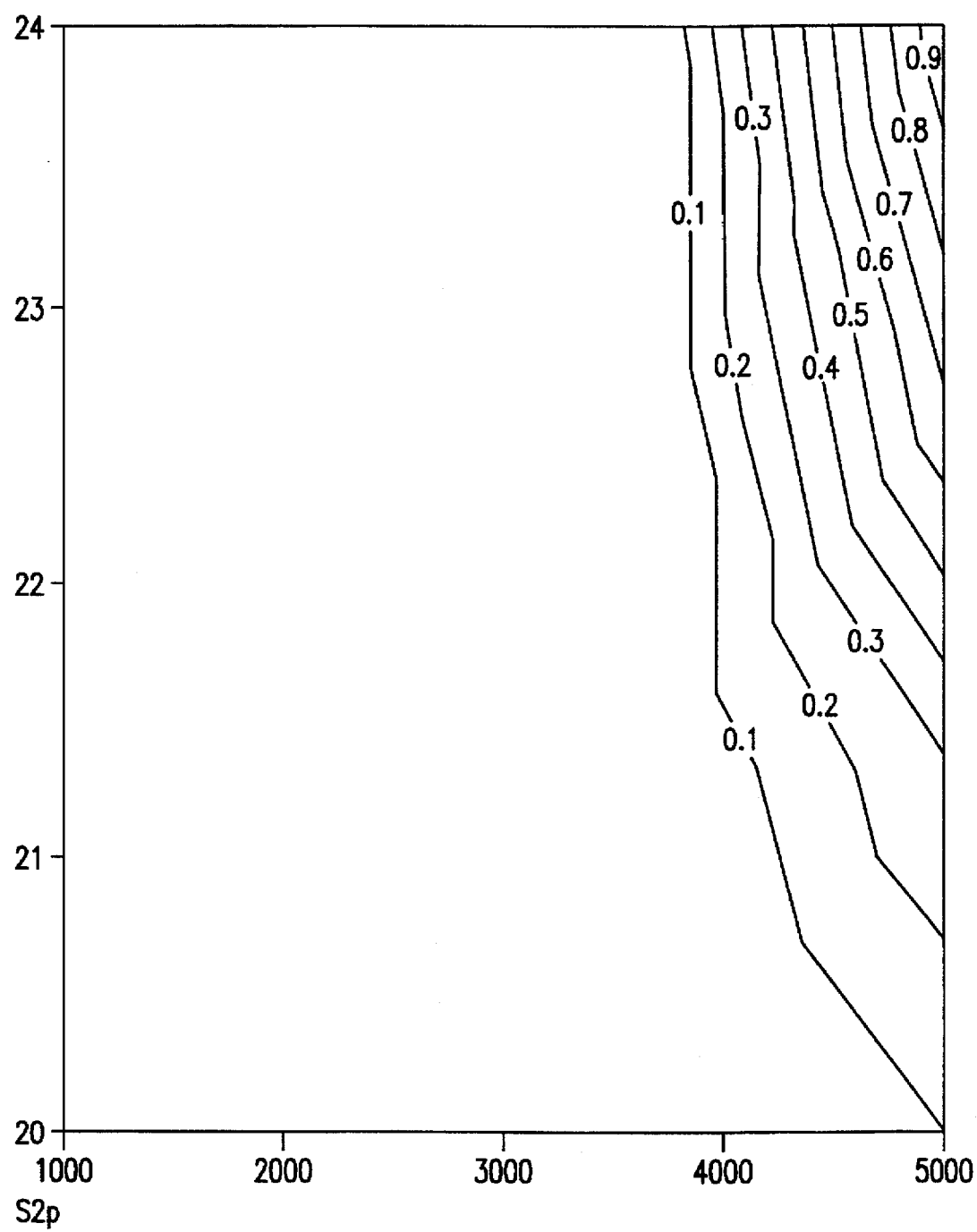

FIG. 3B shows an example satisfaction density profile for a sell transaction in the same format as the contour plot in FIG. 3A. The satisfaction density profile of FIG. 3B could represent, for example, an agency sell order.

Figure 3C:
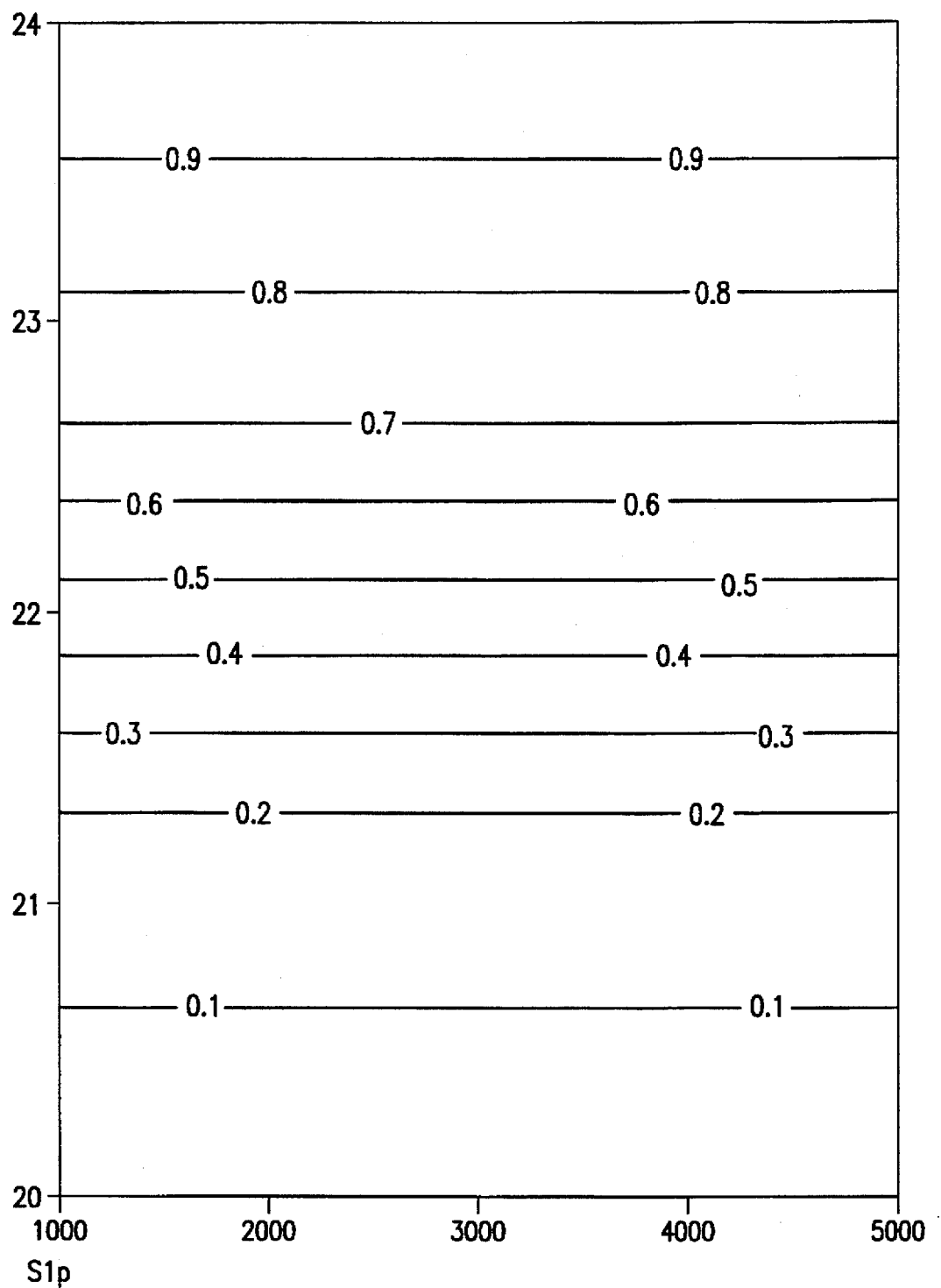

As another example, FIG. 3C shows a satisfaction density profile for a sell transaction. FIG. 3C illustrates a "soft" limit order.

Figure 3D:
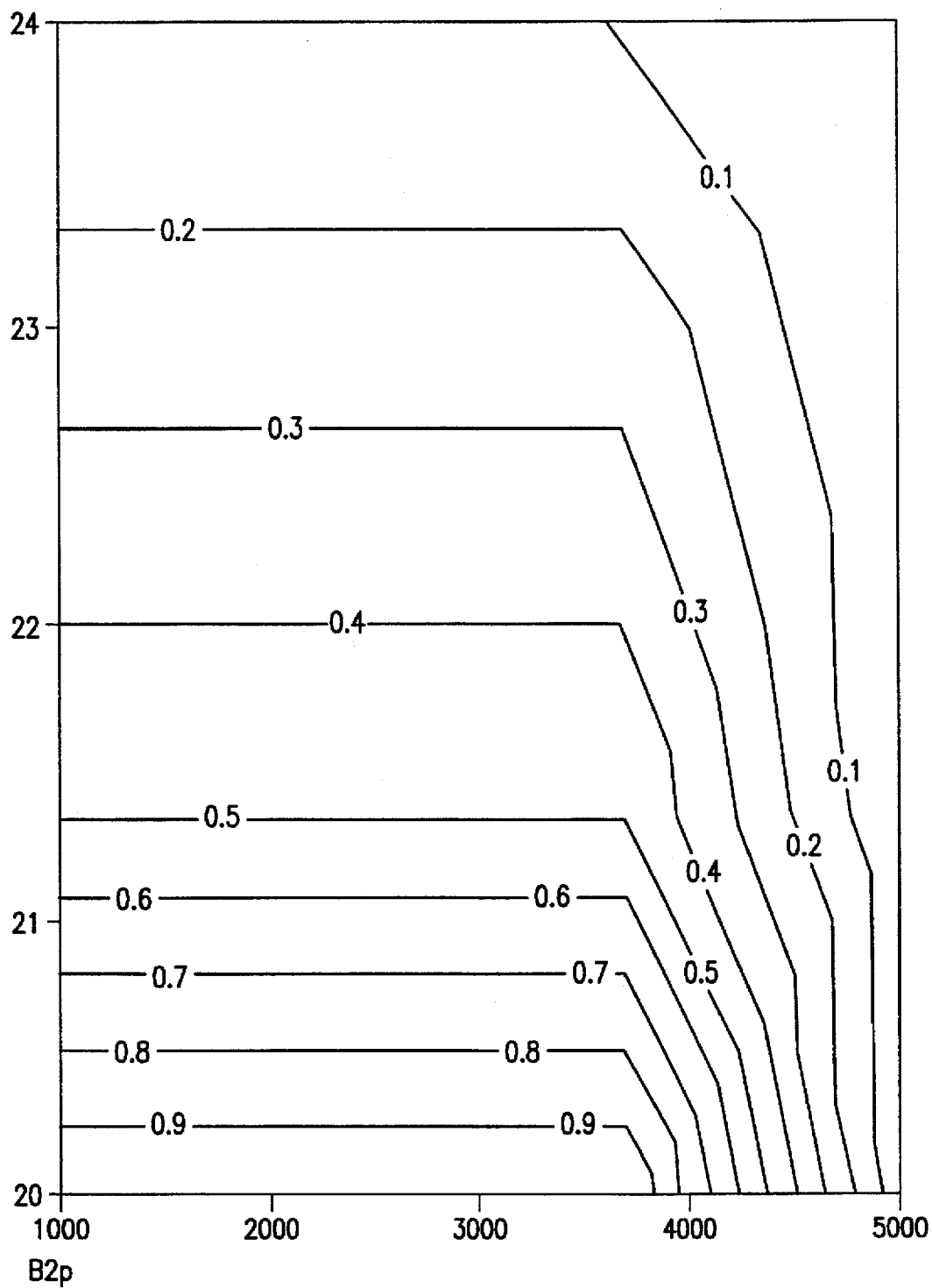

As another example, FIG. 3D shows a satisfaction density profile for a buy transaction.

Figure 4:
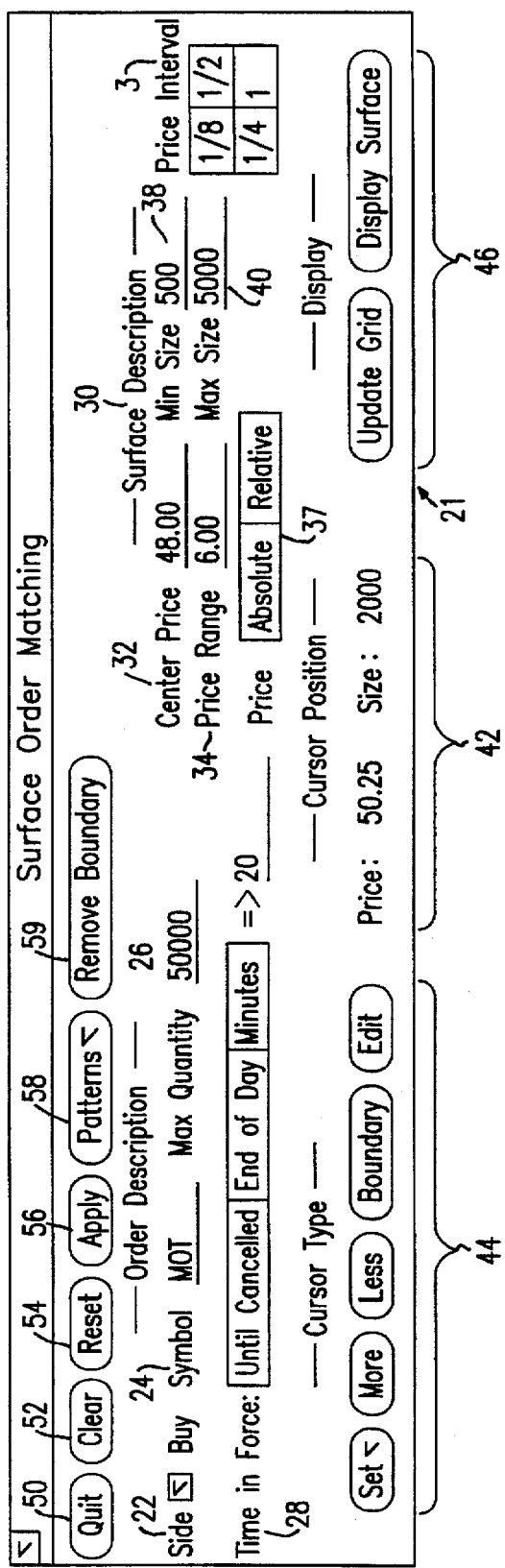
FIG. 4 is an example interface window, used to set parameters for and enable input of satisfaction density profiles.

Turning now to FIG. 4, there is illustrated an example interface window 21 that can be used by a trader to set parameters when inputting a satisfaction density profile. In the representative embodiment, the interface window 21 is displayed on an Input/Output device (e.g., 16, 18, 20). The interface window 21 in the representative embodiment can be manipulated according to standard graphical user interface (GUI) commands by a user using, for example, a mouse and a keyboard.

A Side indicator 22 allows the trader to set the type of transaction, e.g., buy, sell, sell short etc. A Symbol indicator 24 allows the trader to set the instrument being traded, e.g., for stocks, the ticker symbol; for futures, the futures symbol, etc. A Maximum Quantity indicator 26 allows the trader to set the maximum quantity to be traded. In FIG. 4, the trader has entered a buy profile to buy a maximum quantity of 50,000 Motorola shares.

The trader can also set a Time-in-Force indicator 28 that determines for how long the order will be valid. Examples of valid Time-in-Force settings include "good until canceled", "good until end of day" and for a set period of time.

A Surface Description section 30 of the interface window 21 allows the trader to define the dimensions of the satisfaction density profile. A Center Price parameter 32 is used to set the price that is displayed in the center of price axis of the satisfaction density profile. A Price Range parameter 34 shows the range for the price on the price axis. A Price Interval parameter 36 enables the trader to set the price interval (i.e., scale) on the price axis of the satisfaction density profile. For example, as shown in FIG. 4, the center price is set at 48 and the price range at 6. Thus, the price axis will vary from a price of 45 to a price of 51 (with 48 being in the center) in price increments of one quarter. A Price parameter 37 can be used to set whether the price is absolute or relative (e.g., pegged to the bid/ask midpoint or to the average price of the last match of that security).

A Min Size parameter 38 and a Max Size parameter 40 allows the trader to set the minimum and maximum limits for the quantity axis of the satisfaction density profile.

Mismatches of grid resolution (e.g., due to different traders using different settings) is handled by interpolation to a common grid resolution. For example, the CMC 2 could determine the smallest grid resolution used and interpolate all coarser grid resolutions to that resolution. Alternatively, the CMC 2 could specify a minimum resolution (e.g. 100 shares and ⅛ in price) and interpolate all coarser grid resolutions to the specified minimum resolution.

A Cursor Position segment 42 will display the coordinates (price, size) of the position of the cursor as the cursor is moved by the user over the satisfaction density profile being created. A Cursor Type section 44 has a number of buttons to control the function of the cursor, for example, a set button, a more button, a less button, a boundary button, and an edit button. The more and less buttons allow the user to increase or decrease the satisfaction density level on the satisfaction density profile at the location of the cursor. In the representative embodiment, the selected satisfaction density value is increased or deceased each time the mouse button is "clicked." The boundary button allows the user to create a boundary, as discussed above at FIG. 2. The edit button allows the user to edit the boundary. The set button allows the user to set a satisfaction density value, so that each time the mouse is "clicked", the set value is placed in the satisfaction density profile at the location of the cursor.

Figure 7B:
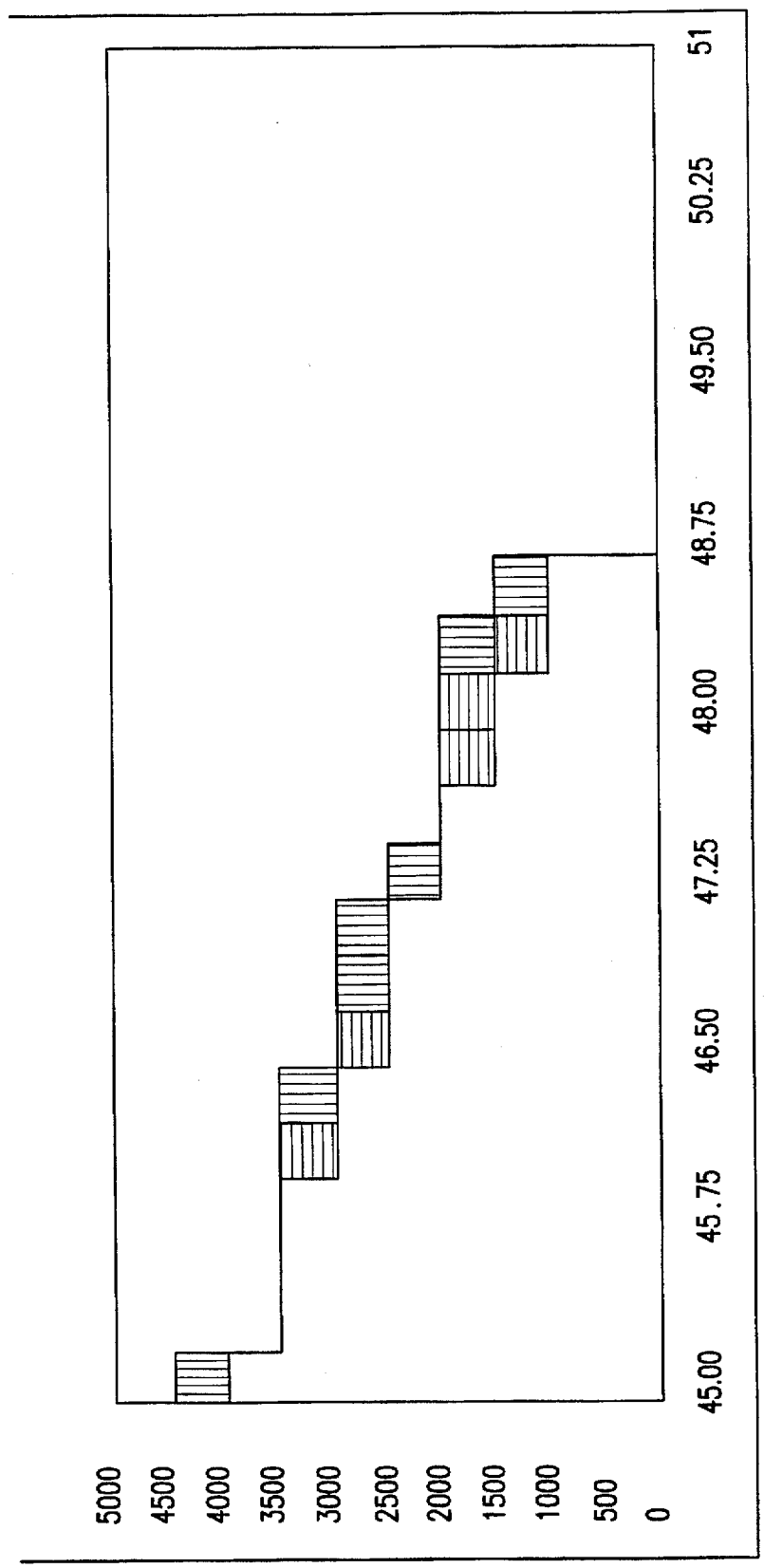

In the representative embodiment, there is a Display section 46 that has two buttons, namely, an Update button and a Display Surface button. The Update Button will redraw the satisfaction density profile. The Display Surface button will allow the user to change the way the satisfaction density profile is displayed, e.g., as a contour plot (as shown in FIG. 2) or a temperature graph (as shown in FIGS. 7A and 7B).

The interface window 21 can also have a quit button 50, a clear button 52, a reset button 54 and an apply button 56. The quit button 50 enables a user to exit from the program that controls the interface window 21. The clear button 52 clears the display of the graph (e.g., the display of the satisfaction density profile) and all other parameter values, such as, for example, the Min Size parameter 38 and the Max Size parameter 40. The reset button 54 "undeletes" the most recent change to the graph, resetting the state of the graph to the immediately preceding state. The apply button 56, when selected, causes the satisfaction density profile to be submitted for matching. A remove boundary button 59, when selected, will remove all boundaries from the satisfaction density profile.

Figure 5:
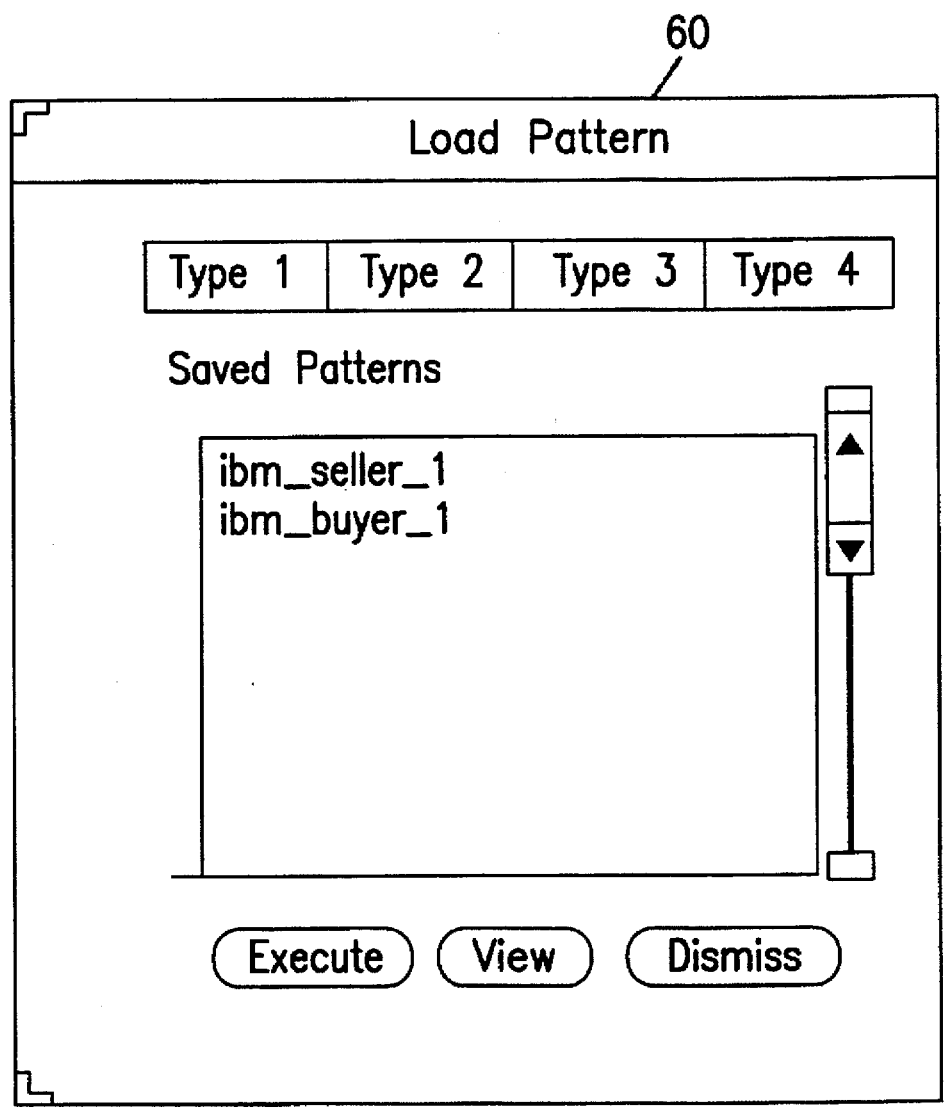
FIG. 5 is a load pattern interface window, used to load parameterized satisfaction density profile templates.

A patterns button 58 allows a user to retrieve predefined or user-defined parameterized templates for common types of satisfaction density profiles. Upon selection of the patterns button 58, a load pattern window 60 (as shown in FIG. 5) will be displayed, that allows the user to select saved patterns. In the example of FIG. 5, there are two saved patterns, namely ibm_seller_1 and ibm_buyer_1, that store patterns that enable a user to quickly load and use satisfaction density profiles to buy and sell IBM stock.

Certain common order types (e.g., market-maker quotes, limit orders, agency orders) can be expressed as parameterized templates that could be selected directly using the Patterns button 58 and the Load Pattern window 60. Once the corresponding template pops up on the display, the user could morph the display to suit the user's preferences as described below.

An even more elegant approach is to use a family of templates that represent two-dimensional basis functions for the surface profile. These functions can be selected from any of the standard two-dimensional orthogonal basis sets (e.g., Fourier, Cosine, Walsh-Hadamard, Haar transforms) or from more generalized and/or data specific basis functions such as those associated with the Gabor and other wavelet transforms or the Karhunen-Loeve transform. Analogous to their role in image data compression, the use of such functions as templates in this application would provide a substantially lower dimensional representation of the buy/sell surface profile, which in turn will correspondingly reduce the dimensionality of the coupling matrices needed to link together the profiles of multiple securities.

Figure 6B:
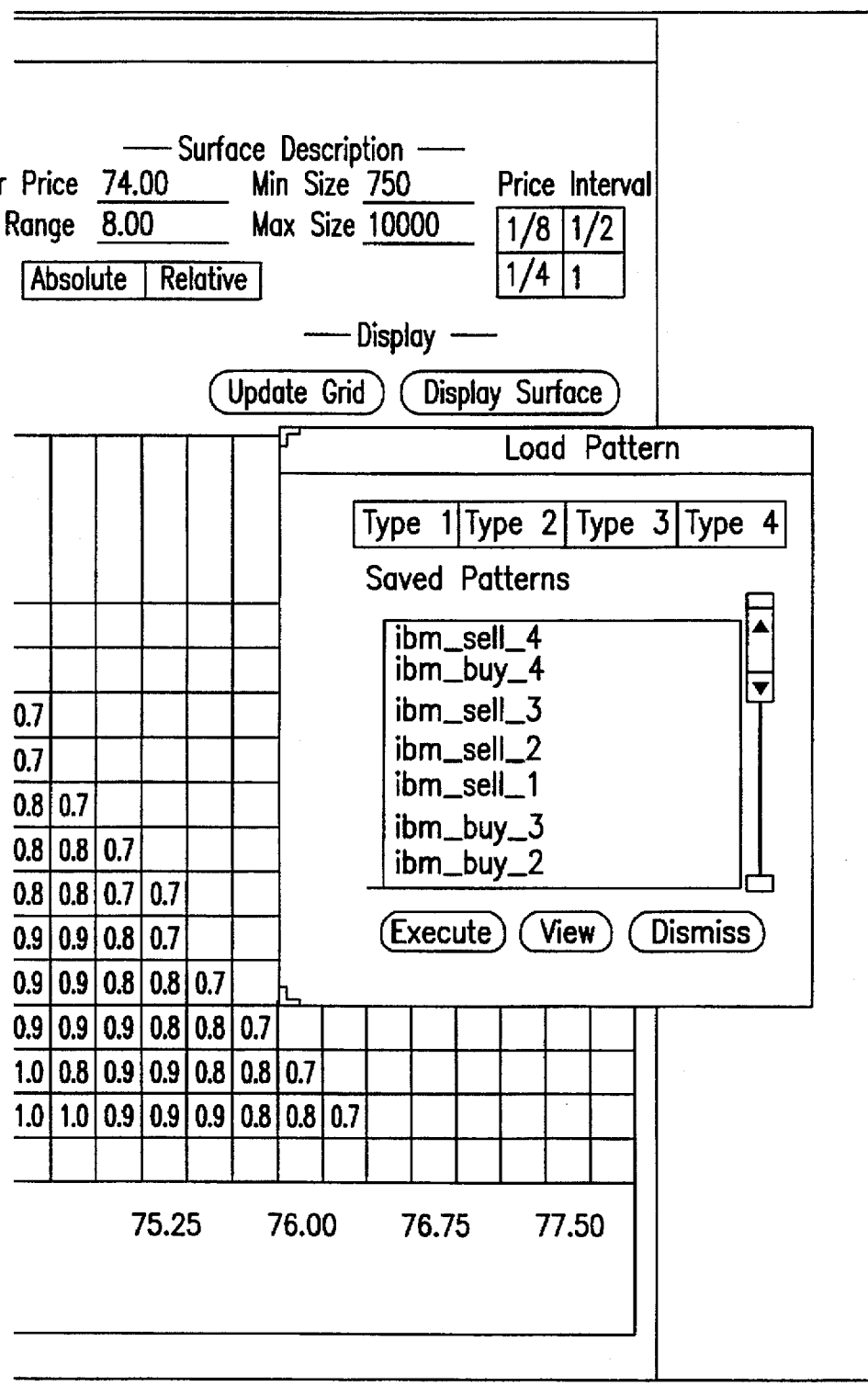

FIGS. 6A and 6B show a full screen display that includes an interface window 21 and the satisfaction density profile of FIG. 2.

As will be appreciated, the entry of buy/sell profiles can be facilitated by a combination of a user-friendly graphical interface and user-tailorable templates. Those illustrated above are merely examples of the types of interfaces that could be used to enter satisfaction density values. In an alternative embodiment, the GUI would provide a set of tools for quickly entering buy/sell profile "peg point" values at selected price/size grid coordinates, along with an arbitrarily drawn boundary outside of which the profile values would be set to zero at all grid points. The CMC 2 would then calculate a two-dimensional (or multi-dimensional) profile that exactly matches the specified points and interpolates between these values to compute all other grid values. This interpolation can be accomplished by a number of mathematical algorithms, including but not limited to triangular tessellations, spline functions, and surface and/or contour plotting programs. The GUI would also include the ability to "morph" a surface profile created in this manner, using mouse hook-and-drag type operations or other similar methods, so that the profile can be altered by the user as desired to achieve a final configuration.

FIGS. 7A and 7B show a buy satisfaction density profile displayed as a temperature graph. The user can cause any satisfaction density profile that has been inputted as a contour plot (or other representation) to be displayed in the form of a temperature graph by selecting the Display Surface button. In the representative embodiment, each (price, quantity) coordinate is represented by a colored square (e.g., 80), with the color of the square signifying the satisfaction density value. For example, in the representative embodiment, a satisfaction density value of 0 is represented by a black square, a satisfaction density value of 1 is represented by a white square, a satisfaction density value of 0.1 is represented by a blue square, a satisfaction density value of 0.2 is represented by a red square, a satisfaction density value of 0.9 is represented by a yellow square, and so on. Using this display, the trader can view the satisfaction density profile as a meaningful and colorful graphical display.

As shown in FIGS. 2, 3, 6A, 6B, 7A and 7B, there are many ways and forms for creating and representing a satisfaction density profile on a computer interface and for inputting satisfaction density values.

Figure 8:
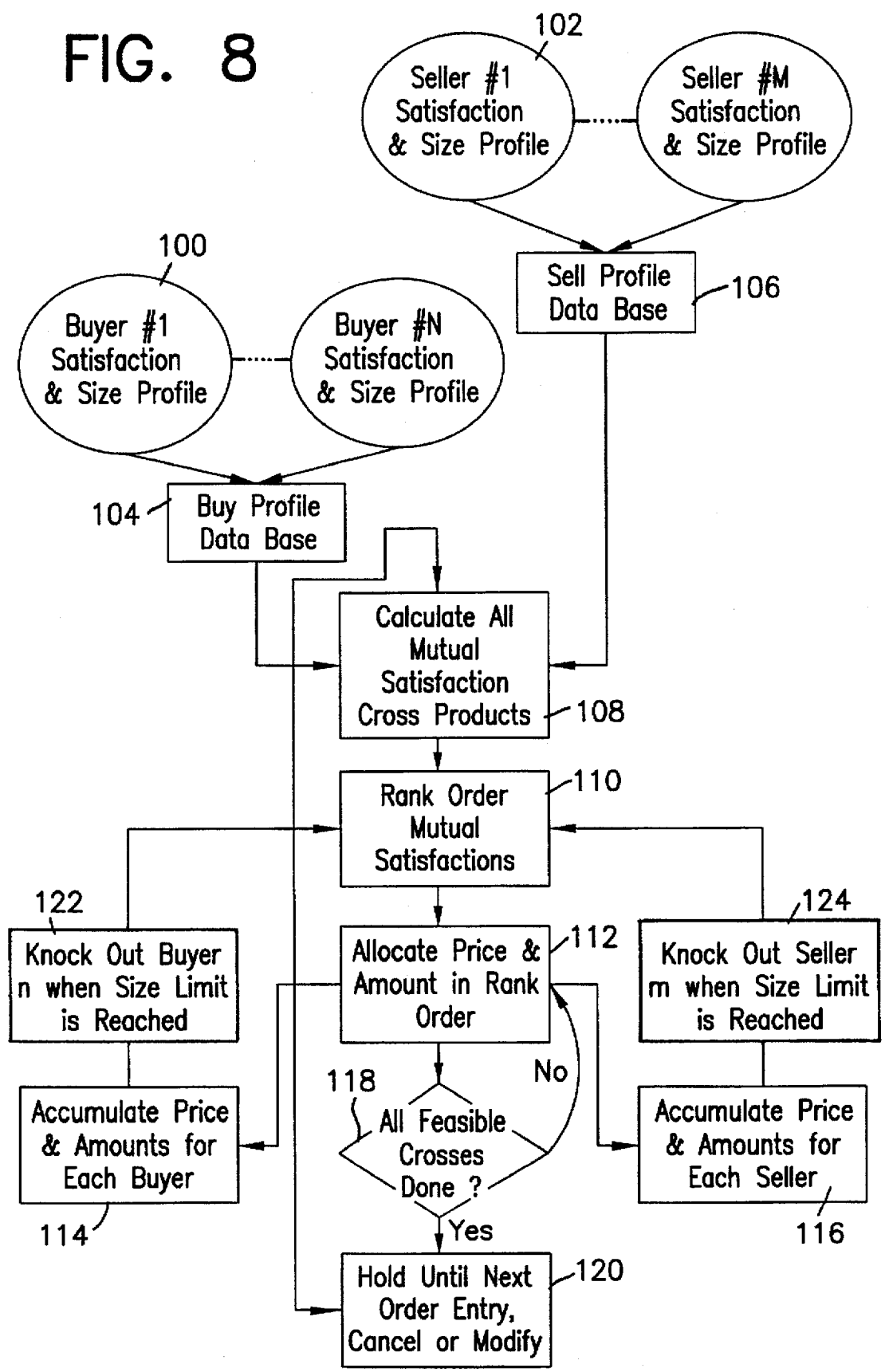
FIG. 8 is a description of the matching process in flow chart format.

FIG. 8 is a flow chart representing the overall steps performed in accordance with the present invention. Traders enter satisfaction density profiles, as discussed above, at steps 100 and 102. It will be appreciated that many traders can each enter one or more satisfaction density profiles. For convenience, FIG. 8 shows that the buy and sell profiles are entered at different steps (i.e., steps 100 and 102); however, the same interface (e.g., interface window 21) and terminals 10, 12, 14 are used for the input of both buy and sell profiles. In fact, steps 100 and 102 could conceptually be considered to be the same step, merely with differing data.

In the representative embodiment of the present invention, buy satisfaction density profiles, when ready for matching, are transmitted to the CMC 2 and stored in a buy profile database 6 (step 104). Sell satisfaction density profiles, when ready for matching, are transmitted to the CMC 2 and stored in a sell profile database 8 (step 106).

At step 108, the CMC 2 calculates, for each possible buy/sell combination stored in the buy profile database 6 and sell profile database 8, a mutual satisfaction function, which, in the representative embodiment, is a mutual satisfaction cross product. The mutual satisfaction cross product represents the potential for that buy/sell pair mutually to satisfy each side. By way of example, if there are three buy profiles (A, B, C) and two sell profiles (1, 2), the CMC 2 will calculate six mutual satisfaction cross products, e.g. A1, A2, B1, B2, C1, C2.

At step 110, the CMC 2 ranks each grid element (possible buy/sell pair at a corresponding price and size) of each mutual satisfaction cross product in order from largest to smallest. The buy/sell pairs are then matched in the ranked order (step 112), accumulating the price and size for the buyer and seller of each matched transaction (steps 114 and 116). When the size limit for a particular satisfaction density profile is reached, all remaining lower ranked grid elements involving that profile are removed from consideration (steps 122 and 124). If all feasible (i.e., non-zero mutual satisfaction) crosses have not been done (step 118), then control returns to step 112. If all feasible crosses have been completed, then the process is temporarily suspended until the next order is entered or an existing unmatched order is canceled or modified (step 120), upon which control returns to step 108.

To operate the present invention as a continuous crossing network, then control should return to step 108 whenever a new order is entered or an existing order canceled or modified.

Certain aspects of FIG. 8 can be described more precisely in mathematical notation, as follows. This explanation will begin with a batch process description, and then show how this extends directly to a continuous crossing strategy.

Assume we have M buyers and N sellers in a crossing pool for a given stock. We define $B_i(p,s)$ as the "satisfaction density" of the i-th buyer for receiving a portion, s, of his fill at price p, where $0 \leq B_i(p,s) \leq 1$. Along with this profile, the buyer will have a maximum size limit $\beta_i$. Let $S_k(p,s)$ and $\alpha_k$ be the corresponding satisfaction density and size limit for the k-th seller. These satisfaction density profiles are two-dimensional surfaces over a grid of price and size coordinates that characterize the participant's degree of satisfaction in the transaction. A value of zero in any coordinate cell indicates no satisfaction (i.e., no desire for any portion of the transaction to be accomplished at the corresponding cell price), while a value of unity indicates full satisfaction. In-between values correspond to limited degrees of satisfaction. Mathematically, these values represent "fuzzy" variables that characterize the degree of membership of a particular price/size transaction in the set of satisfying transactions.

Certain characteristics of the satisfaction density functions can be derived from obvious constraints. For a given value of size, we have:

$B_i(p_1,s) \geq B_i(p_2,s)$ if $p_1 < p_2$ (i.e., buyers prefer lower prices), $B_i(p,s) \uparrow 1$ as $p \downarrow 0$ (full satisfaction as price goes to zero), $B_i(p,s) \uparrow 0$ as $p \downarrow \infty$ (no satisfaction as price goes to infinity), and similarly, $S_k(p_1,s) \geq S_k(p_2,s)$ if $p_1 > p_2$ (i.e., sellers prefer higher prices), $S_k(p,s) \uparrow 1$ as $p \downarrow \infty$ (full satisfaction as price goes to infinity), $S_k(p,s) \uparrow 0$ as $p \downarrow 0$ (no satisfaction as price goes to zero).

For a given price p, there is no similar set of ordinal relationships with respect to size. However, there are special cases that typically would arise in trading. For example, the satisfaction density of a marketmaker at a given price p might be constant for sizes from zero up to 1,000 shares, and then decline rapidly to zero for larger sizes. The satisfaction density of an agency broker might be non-zero only for sizes up to the client's order size. The satisfaction density of an accumulating or divesting investor might exhibit a broad hump in size centered at some large value.

We define the mutual satisfaction density between the i-th buyer and the k-th seller to be $$J_{ik}(p,s) = B_i(p,s) S_k(p,s), \; i=1, \ldots M; \; j=1, \ldots N.$$

This product lies between zero and unity in value, and provides a measure of the relative degree to which a given price and size satisfy a particular pair of buyer and seller. There will be MN such mutual satisfaction densities for all participants in the batch.

Numerous other alternatives for defining these mutual satisfaction densities are available. For example, an alternative definition could be $$J_{ik}(p,s) = \min \{B_i(p,s), S_k(p,s)\}$$

It will be apparent that other definitions are possible that accomplish the same objective of characterizing the degree of mutual satisfaction.

The optimization problem is: what allocation of amounts and prices $$(p_{ik}, a_{ik}) \; i=1 \ldots M; \; j=1 \ldots N$$

between the i-th buyer and the k-th seller results in the maximum joint mutual satisfaction over all participants? This is equivalent to maximizing $$J = \sum_{i=1}^{M} \sum_{k=1}^{N} J_{ik}(p,s)$$

subject to the size constraints $$\sum_{k=1}^{N} s_{ik} \leq \beta_i,$$

$$\sum_{i=1}^{M} s_{ik} \leq \sigma_k.$$

This maximization can be performed as follows:
1. At each price/size value in the grid, compute the MN values of $J_{ik}$ (p,s).
2. Over all price/size grid values, rank the $J_{ik}$ (p,s) from largest to smallest, saving the index values corresponding to both the buyer/seller pair and the grid coordinates.
3. Allocate price and size, starting with the highest ranked $J_{ik}$ (p,s), and accumulate the amounts for each buyer/seller. When a size limit is reached, knock out of the ranked list any remaining entries for that buyer/seller.

Any ties in the ranking process could be arbitrated by random drawing in step three, in order to be fair to all participants. Alternatively, where there is a tie, the CMC 2 could select the match that would result in the greatest overall mutual satisfaction over all possible securities being accomplished. For example, the CMC 2 could "look ahead" and determine whether any other possible matches depend upon one of the tied possible matches occurring.

The CMC 2 can then aggregate all allocations between each pair of buyer and seller to compute a single size and price for their transaction as follows:

$$s_{ik} = \sum_m \sum_n s_{ik}(m,n)$$

(total size, where (m,n) are grid point coordinates corresponding to non- zero mutual satisfactions)

$$P_{ik} = \frac{\sum_m \sum_n p_{ik}(m,n) s_{ik}(m,n)}{s_{ik}} \quad \text{(average price)}.$$

Numerous variations on this theme are possible. For example, in a representative embodiment, the present invention may allow a minimum threshold of mutual satisfaction in the ranking process, below which no allocations are made. Furthermore, the satisfaction density for one stock can be made a function of the allocations already made in another stock.

To convert the batch process into a continuous one, each new satisfaction density entered into the crossing network of the present invention is treated as an event that triggers a new round of computation as described above. While the computation requirements to implement this process in real time for all stocks are significant, they are well within the capability of modern supercomputers.

The following is a simple example to illustrate the operation of the present invention. This example assumes that there are two buy profiles and two sell profiles entered by traders into the system for the trade of a single stock. The four satisfaction density profiles can be represented as the following matrices, with price being rows and quantity being columns:

| Buyer #1 Profile | B1: = | 0 | 0 | 0 | 0 |
|---|---|---|---|---|---|
| | | .1 | 0 | 0 | 0 |
| | | .8 | .7 | .3 | .1 |
| | | 1 | .8 | .4 | .2 |
| Buyer #2 Profile | B2: = | .1 | .1 | .1 | 0 |
| | | .3 | .3 | .3 | 0 |
| | | .5 | .5 | .5 | 0 |
| | | 1 | 1 | 1 | 0 |
| Seller #1 Profile | S1: = | 1 | 1 | 1 | 1 |
| | | .7 | .7 | .7 | .7 |
| | | .2 | .2 | .2 | .2 |
| | | 0 | 0 | 0 | 0 |
| Seller #2 Profile | S2: = | 0 | 0 | 0 | .5 |
| | | 0 | 0 | 0 | .7 |
| | | 0 | 0 | 0 | .3 |
| | | 0 | 0 | 0 | .1 |

Buyer #1 Profile is represented graphically as a contour plot in FIG. 3A. Buyer #2 Profile is represented graphically as a contour plot in FIG. 3D. Seller #1 Profile is represented graphically as a contour plot in FIG. 3C. Seller #2 Profile is represented graphically as a contour plot in FIG. 3B.

Then the four mutual satisfaction cross products produced at step 108 are as follows:

| J11: = (B1 · S1) | | | | |
|---|---|---|---|---|
| J11 therefore equals | 0 | 0 | 0 | 0 |
| | .07 | 0 | 0 | 0 |
| | .16 | .14 | .06 | .02 |
| | 0 | 0 | 0 | 0 |
| J12: = (B1 · S2) | | | | |
| J12 therefore equals | 0 | 0 | 0 | 0 |
| | 0 | 0 | 0 | 0 |
| | 0 | 0 | 0 | .03 |
| | 0 | 0 | 0 | .02 |
| J21: = (B2 · S1) | | | | |
| J21 therefore equals | .1 | .1 | .1 | 0 |
| | .21 | .21 | .21 | 0 |
| | .1 | .1 | .1 | 0 |
| | 0 | 0 | 0 | 0 |
| J22: = (B2 · S2) | | | | |
| J22 therefore equals | 0 | 0 | 0 | 0 |
| | 0 | 0 | 0 | 0 |
| | 0 | 0 | 0 | 0 |
| | 0 | 0 | 0 | 0 |

Figure 9A:
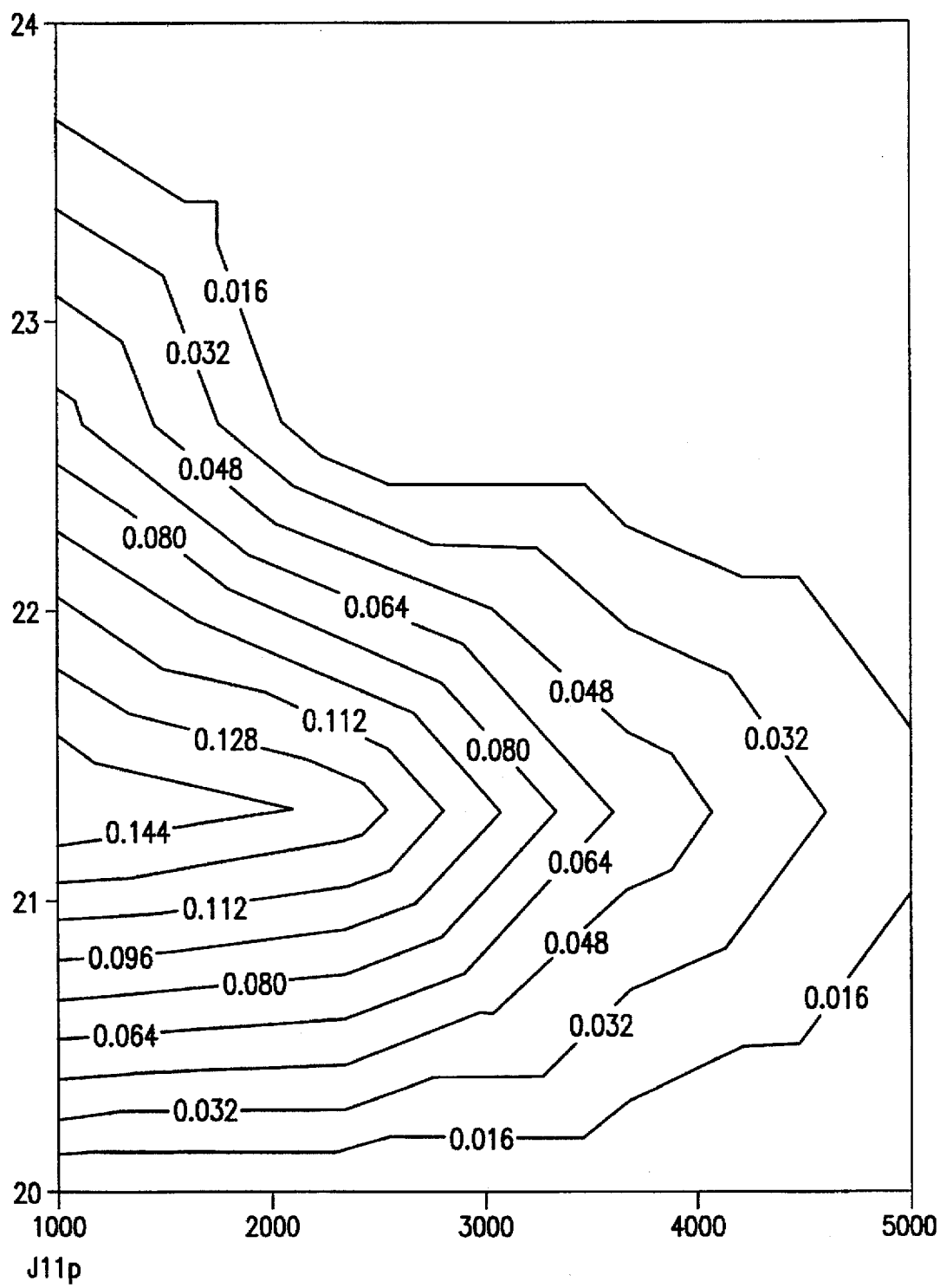
FIGS. 9A to 9C are example mutual satisfaction cross products, represented as contour graphs.
Figure 9B:
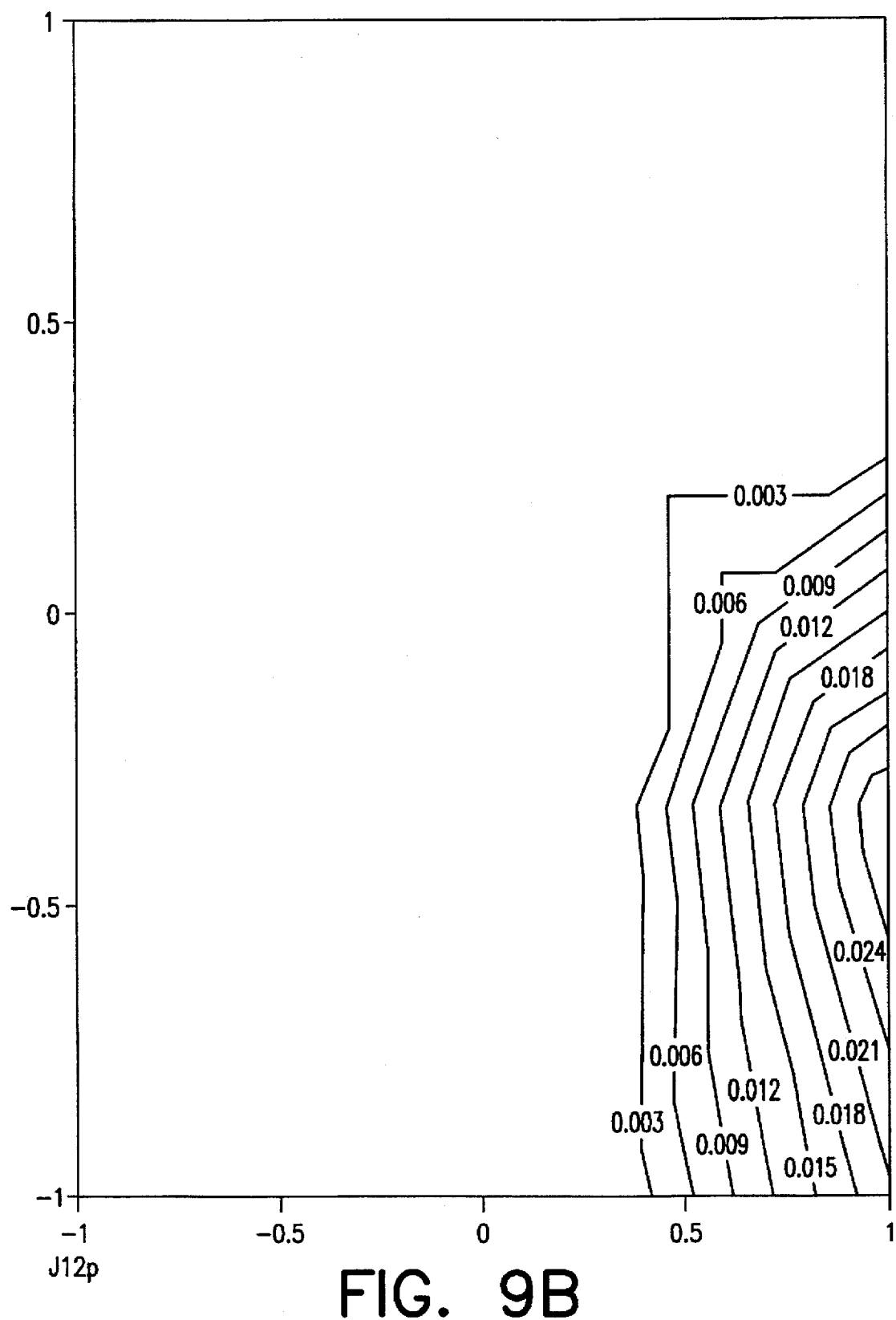
Figure 9C:
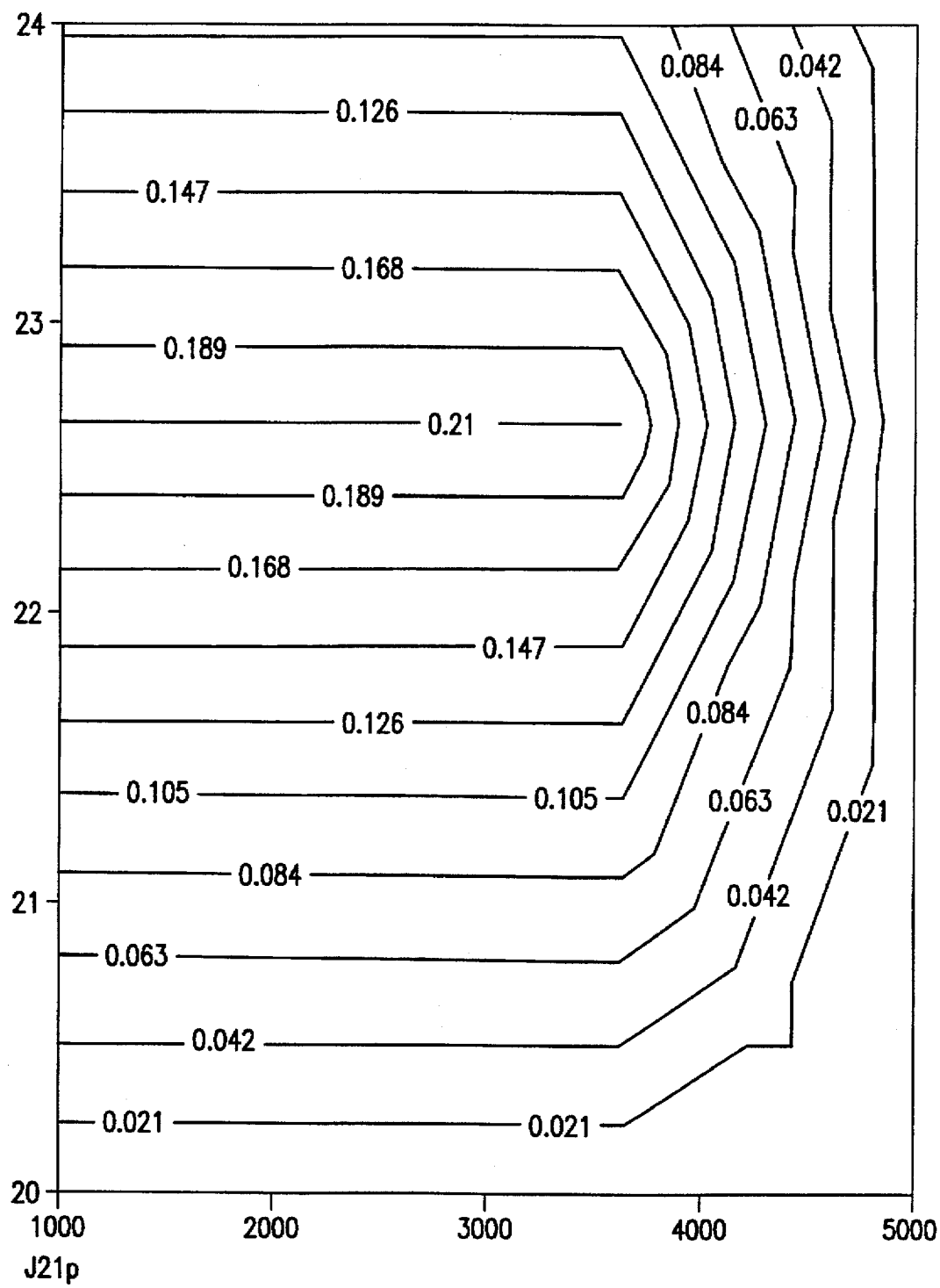

J11 is represented graphically, as a contour plot, in FIG. 9A. J12 is represented graphically, as a contour plot, in FIG. 9B. J21 is represented graphically, as a contour plot, in FIG. 9C. J22 is represented graphically as a blank contour plot (not illustrated).

Ranking each (price, quantity) pair from the above four grids gives the following vector:
w=(0.21, 0.21, 0.21, 0.16, 0.14, 0.1, 0.1, 0.1, 0.1, 0.1, 0.1, 0.07, 0.06, 0.03, 0.02, 0.02, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0)

If there are a number of possible trades ranked equally (e.g., there are three possible trades ranked first above), then one is chosen at random or, as explained above, according to a predetermined scheme to increase overall mutual satisfaction in the matching process.

The present invention can easily handle trades of baskets of securities. In such case, the CMC 2 will functionally link related satisfaction density profiles into one. This linking process can be accomplished in its most general form, for example, by matrix manipulation of the two profiles utilizing a connection matrix.

In further embodiments, additional variables (or parameters) can be included that have an effect on the satisfaction density profile. For example, an eligibility variable or an urgency variable (or both) could be set by the trader, as explained below. To further elaborate, consider the following scenarios:

A. A trader has a "buy basket" and a "sell basket" whose execution status cannot become too far unbalanced on either side, in dollars or shares or both.

B. A trader wants to become more (or less) aggressive about buying/selling a given security as a function of the execution status of other securities in the traders' actual/desired basket.

C. Some combination of A. and B. above.

To account for these constraints and relationships, the satisfaction density profile of the present invention can be augmented to include two other variables: eligibility and urgency. In the most general case, each of these variables can take on a value between and including zero and one. Alternatively, each could have a binary value, zero or one. In one embodiment, the eligibility variable has a binary value and the urgency variable has a value between and including zero and one.

Both the urgency variable and the eligibility variable can be associated with the satisfaction density profile as a whole (e.g., one value per variable per profile) or each coordinate of the satisfaction density profile (e.g., one value for each (price, size) coordinate.)

The eligibility value, when associated with each coordinate, represents the degree to which that grid point is eligible for matching. In the simplest case, the eligibility variable is a binary variable that is used to track execution status, i.e., all values of the eligibility variable are assigned a value of one at order profile entry, and matched values are set to zero upon matching. Thus, in this embodiment, the eligibility variable could keep track of when matches have occurred. In a more general case, the eligibility of unmatched values could be held to zero pending satisfaction of execution status constraints of other securities (e.g., as in scenario A. above). Thus, the eligibility variable could be used as a coupling between two different stocks. In a most general case, the eligibility variable could be a "fuzzy" variable, having values between and including zero and one, that would allow for "soft" (i.e., continuous-valued) constraints such as "I want to sell [some | a good amount | a lot] of IBM before I buy [some | much | a large amount] of DEC.

The urgency variable represents the degree to which a particular grid point satisfaction value should be either (a) translated in the direction of a more aggressive price, or (b) warped to a more aggressive satisfaction value, or both. In the representative embodiment, there is one urgency value per satisfaction density profile (i.e., urgency is condensed to a single scalar value for each security, applied uniformly), and the value of the urgency variable ranges from zero to one. In the normal case, the urgency variable would have a value of zero, representing regular trading urgency. Non-zero values of the urgency variable would signify the degree of urgency, with one being the most urgent.

For case (a) immediately above, a non-zero value of the urgency variable would translate the whole satisfaction density profile up in price (for a buy) or down in price (for a sell). In this instance, the boundaries of the satisfaction density profile would shift accordingly.

In case (b), non-zero values of the urgency variable would exponentially warp the satisfaction density values. Assume that the urgency variable is assigned a value u. Then each (non-zero) satisfaction density value is raised to the power (1-u). In this case, the boundaries of the satisfaction density profile are not changed.

The above described embodiments are merely illustrative of the principles of the present invention. Other embodiments of the present invention will be apparent to those skilled in the art without departing from the spirit and scope of the present invention.

What is claimed is:

1. A crossing network that matches orders for a plurality of instruments based upon a satisfaction and size profile, the crossing network comprising:

a plurality of trader terminals for entering an order for an instrument in the form of a satisfaction density profile that represents a degree of satisfaction to trade the instrument at a plurality of (price, quantity) combinations, each satisfaction density profile representing either a buy order or a sell order for the instrument; and a matching controller computer coupled to each one of the plurality of trader terminals over a communications network and receiving as input each satisfaction density profile entered at each one of the plurality of trading terminals, the matching controller computer comprising means for pairing each satisfaction density profile representing a buy order with each satisfaction density profile representing a sell order, means for calculating for each satisfaction density profile pair a mutual satisfaction function, each mutual satisfaction function including a plurality of (price, quantity) combinations representing a degree of mutual satisfaction for trading said quantity at said price, means for ranking according to the degree of mutual satisfaction every (price, quantity) combination of every mutual satisfaction function, and means for matching, in accordance with the ranking, buy orders with sell orders.

2. The crossing network of claim 1 wherein the matching controller computer further comprises means for selecting between (price, quantity) combinations having the same ranking.

3. The crossing network of claim 1 wherein the matching controller computer matches orders in real time as each order is received at the matching controller computer.

4. The crossing network of claim 1 further comprising means for associating each satisfaction density profile with a trading terminal.

5. The crossing network of claim 1 wherein the matching controller computer further comprises means for accumulating matched (price, quantity) combinations for each trading terminal.

6. The crossing network of claim 1 wherein satisfaction density profile is a two-dimensional graph having a price axis and a quantity axis.

7. The crossing network of claim 1 wherein the satisfaction density profile is entered at the trading terminal as a contour graph.

8. The crossing network of claim 1 wherein the satisfaction density profile is entered at the trading terminal as a temperature graph.

9. The crossing network of claim 1 wherein each satisfaction density profile includes a satisfaction density value for each (price, quantity) combination.

10. The crossing network of claim 1 further comprising means for combining a plurality of satisfaction density profiles.

11. The crossing network of claim 1 wherein each trader terminal further comprises means for enabling related satisfaction density profiles to be linked.

12. A crossing network that matches buy and sell orders based upon a satisfaction and quantity profile, the crossing network comprising:

a plurality of trader terminals for entering an order for an instrument in the form of a satisfaction density profile that represents a degree of satisfaction to trade the instrument at a plurality of (price, quantity) combinations, each order being either a buy order or a sell order for the instrument; and a matching controller computer coupled to each one of the plurality of trader terminals over a communications network and adapted to receive as input satisfaction density profiles entered at each one of the plurality of trading terminals, the matching controller computer pairing each satisfaction density profile representing a buy order with each satisfaction density profile representing a sell order, and calculating for each satisfaction density profile pair a mutual satisfaction cross product representing a degree of satisfaction to which the satisfaction density profiles in the satisfaction density profile pair satisfy each other, and ranking each (price, quantity) combination of each mutual satisfaction cross product in an order, the matching controller computer thereafter matching buy orders and sell orders in accordance with the ranked order.

13. The crossing network of claim 12 wherein the sell order includes a sell short order.

14. The crossing network of claim 12 wherein the instrument includes stocks.

15. The crossing network of claim 12 wherein the instrument includes futures.

16. The crossing network of claim 12 wherein the instrument includes currencies.

17. The crossing network of claim 12 wherein the instrument includes bonds.

18. The crossing network of claim 12 wherein the instrument includes options.

19. The crossing network of claim 12 wherein satisfaction density profile is a two-dimensional graph having a price axis and a quantity axis.

* * * * *

UNITED STATES PATENT AND TRADEMARK OFFICE
CERTIFICATE OF CORRECTION

PATENT NO. : 5,689,652

DATED : 18 November 1997

INVENTOR(S) : William A. LUPIEN et al.

It is certified that error appears in the above-identified patent and that said Letters Patent is hereby corrected as shown below:

| Column | Line | |
|---|---|---|
| 10 | 13 | Change "$B_i(p,s) \uparrow$ ) as $p \downarrow \infty$" to --$B_i(p,s) \downarrow 0$ as $p \uparrow \infty$--. |
| 10 | 19 | Change "$p \downarrow \infty$" to --$p \uparrow \infty$--. |
| 10 | 21 | Change "$\uparrow 0$" to --$\downarrow 0$--. |

Signed and Sealed this

Fifteenth Day of December, 1998

Attest:

BRUCE LEHMAN

*Attesting Officer*   *Commissioner of Patents and Trademarks*